United States Patent
Gualdi et al.

[15] 3,686,293
[45] Aug. 22, 1972

[54] PROCESS FOR THE PREPARATION OF AROMATIC CARBOXYLIC ACIDS

[72] Inventors: Giorgio Gualdi, Piazza Isotta Nogarola 7, Verona; Luigi Lugo, Via dei Tulipani 14, Milan; Cesare Reni, Via Oberdan 10, Busto Arsizio (Varese), all of Italy

[22] Filed: July 13, 1970

[21] Appl. No.: 54,604

[52] U.S. Cl. ..........................260/524 R, 252/429 R
[51] Int. Cl. ..............................................C07c 63/02
[58] Field of Search ..................................260/524 R

[56] References Cited

UNITED STATES PATENTS

| | | |
|---|---|---|
| 3,240,803 | 3/1966 | Thompson et al. ........260/524 |
| 2,245,528 | 6/1941 | Loder........................260/524 |
| 2,907,792 | 10/1959 | McIntyre...................260/524 |

*Primary Examiner*—Lorraine A. Weinberger
*Assistant Examiner*—R. S. Weissberg
*Attorney*—Sughrue, Rothwell, Mion, Zinn & Macpeak

[57] ABSTRACT

A process for the catalytic oxidation of p-xylene is liquid phase to form terephthalic acid, consisting essentially of partially oxidizing p-xylene, in an initial stage of reactions, in an aliphatic carboxylic acid environment and in the presence of catalysts consisting of heavy metal salts, oxidation being completed, in a second stage of reaction, in the presence of a bromoaldehyde by way of reaction activator.

13 Claims, No Drawings

PROCESS FOR THE PREPARATION OF AROMATIC CARBOXYLIC ACIDS

This invention relates to an improved process for the preparation of terephthalic acid by the oxidation of p-dialkyl benzenes and in particular p-xylene, in the presence of catalysts and in an aliphatic carboxylic acid environment.

Various methods are known whereby aromatic carboxylic acids can be prepared by the catalytic oxidation of alkyl benzenes in an inert liquid environment.

In these processes, xylenes, for example, are converted into the corresponding phthalic acids, toluene into benzoic acid and p-diisopropyl benzene into terephthalic acid.

Products extremely useful to industry are obtained in this way. Terephthalic acid, for instance, normally in diester form, is converted, in conjunction with glycols, into polymers that can be used in the production of yarns.

In processes in which alkyl benzenes are oxidized to form the corresponding carboxylic acids in an inert liquid environment, use is made of reaction catalysts consisting of salts of heavy metals and activators consisting of bromine or derivatives thereof.

The catalysts normally employed are salts of cobalt and manganese, while the activators generally consist of hydrobromic acid and alkali metal bromides.

The oxidation processes described, however, have the disadvantages derived from somewhat low conversion rates and poor selectivity, so that unchanged material and more especially partially oxidized material are recovered at the end of the reaction; nor are better results obtained by the use of various activators such as, for example, aldehydes or ketones.

Thus, to avoid losses, the discharged solution may be re-cycled after separation of the reaction products.

This procedure, however, is not desirable, since impurities accumulate in the reaction environment and interfere with the progress of the oxidation.

Hence, in some processes, the unconverted substances are recovered partially by subjection to further oxidation by treatment with nitric acid, for instance. This, though, complicates the oxidation process, with obvious economic disadvantages.

It has now been discovered that it is possible to obtain terephthalic acid with high yields and selectivity by a process consisting essentially of partially oxidizing p-xylene, in an initial stage of reaction, in an aliphatic carboxylic acid environment and in the presence of catalysts consisting of heavy metal salts, oxidation being completed, in a second stage of reaction, in the presence of a bromoaldehyde by way of reaction activator.

To be more precise, in the initial stage of reaction, the oxidizing gas, preferably air, if fed into a reaction environment comprising p-xylene, the aliphatic carboxylic acid and heavy metal salts.

This stage is carried out at temperatures of 130° to 220° C. and pressures of up to 30 atmospheres, in conditions such that the initial weight ratio between the aliphatic carboxylic acid and the p-xylene lies between 1:1 and 10:1. The carboxylic acid used is preferably acetic or propionic acid, while the heavy metals consist of salts of cobalt and manganese.

This stage takes place in the presence of an inorganic bromine compound, for which purpose cobalt bromide or manganese bromide may be employed, or else bromides of alkali metals.

The catalytic salts are used to the extent of 0.1 to 5.0 percent by weight related to the p-xylene, and preferably from 0.15 to 3.0%, bromine being introduced at the same time in the proportion of 0.1 to 10 gram-atoms to every 100 mols of p-xylene put into reaction.

In the first stage of reaction, as already stated, only partial oxidation takes place; in particular, the amount of oxidizing gas admitted is equal to, or up to 30 percent in excess of, what is theoretically required to convert the p-xylene into p-toluic acid.

The second stage of reaction is carried out in the same conditions as to temperature and pressure as the first stage, a brominated aliphatic aldehyde being introduced in such proportions that the bromine thereby put into reaction is equal to 0.1 to 10 gram-atoms per 100 mols of p-xylene put into the first stage.

In the second stage of reaction, it is also possible to introduce acetic or propionic aldehyde along with the brominated aldehyde. In any case, the number of mols of aldehyde introduced, halogenated or otherwise, should be at most equal to the number of mols of p-xylene introduced in the first stage.

In practice, acetic or propionic aldehyde is used in brominated form, the bromine content being kept within the limits already laid down.

In a recommended form of the invention, the activators are fed to the second stage of reaction along with the aliphatic carboxylic acid, thereby providing control over the reaction temperature.

The amount of aliphatic carboxylic acid put into the second stage of reaction should in any case be such as to keep the ratio between that acid and the p-xylene supplied to the first stage within the limits already laid down.

The oxidizing gas used should preferably be oxygen or a gas containing more than 90 percent of molecular oxygen, this being fed to the second stage at a high enough rate to complete the reaction by which the terephthalic acid is formed.

The conditions should in any case be such as to maintain an oxygen content of 1 to 5 percent in the gases discharged from the reaction vessel.

When the process is carried out in the conditions described, the p-xylene is converted into terephthalic acid in quantities exceeding 90 percent in mols.

It should be noted that poorer results are obtained when the brominated aldehyde is added to the first stage of reaction and the activator used is a non-brominated aldehyde, whether this be added to the first or the second stage of reaction.

By the process with which the invention is concerned, moreover, a crude acid is produced which does not require complicated purification treatment to yield a product that can be used for the purposes for which it is normally intended.

The process here proposed can be carried out discontinuously or, preferably, continuously. For continuous operation, elongated reaction vessels equipped with agitation are used.

The p-xylene, aliphatic carboxylic acid, heavy metal catalyst and bromine derivative activator are fed to the top of the vessel. Air is supplied to a point intermediate between the top and the base of the reaction vessel in such a way as to keep the oxygen content within the limits already referred to.

The aldehyde compound, with or without a further quantity of acetic acid, is fed into the reaction vessel below the air admission level.

Finally, at the base of the reaction vessel, the oxygen is introduced and the reaction products, from which the terephthalic acid is recovered, are removed.

EXAMPLE 1

The reaction vessel used in this experiment was tubular and elongated and had a capacity of approximately 15 liters. It was equipped with an agitator, a heat-exchange jacket and arrangements for introducing the reagents and removing the reaction products.

The top of the vessel was fitted with means for condensing and re-cycling the condensable products.

A baffle was also provided, placed horizontally about half-way up the vessel, its section being such as to allow fluid to pass.

This baffle formed the boundary between an upper (first stage) reaction zone and a lower (two stage) reaction zone.

The following were fed continuously to the top of the reaction vessel: 1.1 liters an hour of p-xylene and 5 liters an hour of glacial acetic acid, together with 10 grams an hour of cobalt bromide and 100 grams an hour of manganese bromide, these salts being supplied in the form of concentrated aqueous solutions.

Immediately above the baffle, air was admitted at a rate equivalent to 1,700 N. liters an hour and the working temperature and pressure were 180° C. and approximately 10 kg./sq.cm.

Immediately below the baffle, 1 liter an hour of acetic acid was admitted, containing 15 grams of bromoacetaldehyde and 50 grams of acetaldehyde.

Commercial oxygen (approx. 95 percent pure) was fed to the base of the reaction vessel at a rate equivalent to approximately 300 N. liters an hour.

The second stage of reaction was carried out at the same temperature and pressure levels as the first stage.

The reaction products were removed continuously from the base of the reaction vessel and from them the terephthalic acid was recovered, this being washed with water and acetic acid.

By this means, 1.35 kg./hour of purified terephthalic acid was recovered.

EXAMPLE 2

The same procedure was followed as in Example 1, 1 litre/hour of glacial acetic acid containing 55 grams of acetaldehyde being fed to the second stage.

By this means, approximately 1.30 kg./hour of terephthalic acid was recovered.

What we claim is:

1. A process for the liquid phase catalytic oxidation of paraxylene to terephthalic acid, comprising the sequential steps of:

feeding air to a first stage reaction mixture consisting essentially of paraxylene, acetic acid, and an inorganic bromine compound selected from the group consisting of cobalt bromide, manganese bromide and mixtures thereof in quantities such that the bromine content amounts to 0.1 to 10 gram-atoms per each 100 mols of paraxylene, wherein: the air supply is such that oxygen is present in a proportion in the range of from equal to or up to 30 percent in excess of the quantity of oxygen theoretically required to convert the paraxylene into paratoluic acid, the weight ratio of acetic acid to paraxylene ranges between 1/1 to 10/1, the temperature is in the range of 130° to 220° C. and the pressure is up to 30 atmospheres, and thereafter completing the reaction of paraxylene to terephthalic acid in a second stage wherein oxygen or gases containing more than 90 percent of molecular oxygen are fed to the product of the first-stage mixture, to which is added a quantity of a brominated aliphatic aldehyde such that the bromine thus introduced is equal to between 0.1 to 10 gram-atoms to each 100 mols of paraxylene introduced into the first stage, wherein: the reaction is carried out at temperatures of 130° to 220° C. and at pressures of up to 30 atmospheres, and the weight ratio between the acetic acid and the paraxylene introduced into the first stage is maintained at between 1:1 and 10:1.

2. A process as claimed in claim 1, in which the inorganic bromides are present in quantities equivalent to 0.1 to 5.0 percent by weight based on the paraxylene.

3. A process as claimed in claim 1, in which the brominated aliphatic aldehyde added in the second stage of reaction is selected from the group consisting of bromo-acetaldehyde or bromopropionaldehyde.

4. A process as claimed in claim 1, in which a mixture of non-halogenated aldehyde is introduced into the second stage of reaction along with the brominated aldehyde, the total quantity of mols of the aldehyde put into the reaction being at most equal to the number of mols of paraxylene introduced into the first stage.

5. A process for the catalytic oxidation of paraxylene in the liquid phase to terephthalic acid consisting of the steps of partially oxidizing, paraxylene in an initial stage of reaction in an aliphatic carboxylic acid and in the presence of a catalyst consisting essentially of a member selected from the group consisting of cobalt bromide, manganese bromide and mixtures thereof, oxidation thereafter being completed in a second stage of reaction in the presence of a bromo-aldehyde reaction activator, and thereafter recovering terephthalic acid, wherein:

air is fed to the initial stage of reaction as the oxidizing agent, and oxygen or gases containing more than 90 percent of molecular oxygen are fed to the second stage of reaction as the oxidizing gas, from 0.1 to 5.0 percent of the catalyst selected from the group consisting of cobalt bromide, manganese bromide and mixtures thereof is present in the first reaction stage, and the bromo-aldehyde introduced into the second stage is a brominated aliphatic aldehyde introduced in quantities such that the bromine introduced is equal to between 0.1 to 10 gram atoms per each 100 mols of paraxylene introduced into the first stage.

6. The process of claim 1 wherein the inorganic bromide is cobalt bromide.

7. The process of claim 1 wherein the inorganic bromide is manganese bromide.

8. The process of claim 1 wherein the inorganic bromide is a mixture of cobalt and manganese bromide.

9. The process of claim 1 wherein the yield of terephthalic acid is greater than 90 mole percent.

10. The process of claim 1 wherein the amount of inorganic bromine compound is 0.15 to 3.0 percent.

11. The process of claim 1 wherein any aldehyde added in said second stage consists essentially of brominated aldehyde.

12. The process of claim 1 wherein acetic acid is also fed to the second stage of said reaction to maintain the ratio of acetic acid to paraxylene within the range of the first stage of said reaction.

13. The process of claim 1 wherein gases are discharged at reaction completion which gases have an oxygen content of 1 to 5 percent.

* * * * *